(12) United States Patent
Han et al.

(10) Patent No.: US 8,321,506 B2
(45) Date of Patent: Nov. 27, 2012

(54) ARCHITECTURE FOR AN EXTENSIBLE REAL-TIME COLLABORATION SYSTEM

(75) Inventors: Mu Han, Redmond, WA (US); Krishnamurthy Ganesan, Redmond, WA (US); Adrian Potra, Issaquah, WA (US); Nikhil Bobde, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/918,855

(22) Filed: Aug. 14, 2004

(65) Prior Publication Data

US 2005/0091435 A1  Apr. 28, 2005

Related U.S. Application Data

(63) Continuation of application No. 10/918,333, filed on Aug. 13, 2004, now abandoned.

(60) Provisional application No. 60/513,790, filed on Oct. 23, 2003, provisional application No. 60/599,807, filed on Aug. 6, 2004.

(51) Int. Cl.
*G06F 15/16* (2006.01)
*H04Q 11/00* (2006.01)

(52) U.S. Cl. ....................... 709/204; 370/260

(58) Field of Classification Search ............... 709/204, 709/205, 206, 207, 228; 370/259, 260
See application file for complete search history.

(56) References Cited

U.S. PATENT DOCUMENTS

| | | | |
|---|---|---|---|
| 5,097,533 A | 3/1992 | Burger et al. | |
| 5,327,558 A | 7/1994 | Burke et al. | |
| 5,539,886 A | 7/1996 | Aldred et al. | |
| 5,724,508 A | 3/1998 | Harple et al. | |
| 5,872,923 A * | 2/1999 | Schwartz et al. | 709/205 |
| 6,167,395 A | 12/2000 | Beck et al. | |
| 6,688,983 B2 | 2/2004 | Yoshizawa | |
| 6,748,420 B1 | 6/2004 | Quatrano et al. | |
| 7,054,648 B2 | 5/2006 | Abtin et al. | |
| 7,073,172 B2 | 7/2006 | Chamberlain | |

(Continued)

FOREIGN PATENT DOCUMENTS

EP  1526695 B1  8/2007

(Continued)

OTHER PUBLICATIONS

Chen et al.; "Web communication services and the PacketIN/sup ®/ application hosting environment."; Bell Labs Technical Journal, {Bell-Labs-Tech-J-USA}, 2002, vol. 7, No. 1, p. 25-40.*

(Continued)

*Primary Examiner* — Lynn Feild
*Assistant Examiner* — Lin Liu
(74) *Attorney, Agent, or Firm* — Merchant & Gould P.C.

(57) ABSTRACT

An architecture for an extensible real-time collaboration system is provided. The architecture presents a unified application program interface for writing application programs that use communications protocols. The architecture has activity objects, endpoint objects, and multiple media stacks. These objects may use various communications protocols, such as Session Initiation Protocol or Real-Time Transport Protocol to send and receive messages. The activity objects, endpoint objects, and multiple media stacks may each have one or more APIs that an application developer can use to access or provide collaboration-related functionality. These objects map the API to the underlying implementation provided by other objects. Using the activity objects enables a developer to provide less application logic than would otherwise be necessary to provide complex collaboration services.

19 Claims, 5 Drawing Sheets

U.S. PATENT DOCUMENTS

| | | | |
|---|---|---|---|
| 7,340,745 B2 | 3/2008 | Waldorf | |
| 7,353,252 B1 | 4/2008 | Yang et al. | |
| 7,360,164 B2 | 4/2008 | Bjoernsen et al. | |
| 7,535,915 B2 | 5/2009 | Collins | |
| 2002/0010771 A1* | 1/2002 | Mandato | 709/223 |
| 2002/0032730 A1 | 3/2002 | Amit et al. | |
| 2002/0059425 A1* | 5/2002 | Belfiore et al. | 709/226 |
| 2002/0069263 A1 | 6/2002 | Sears et al. | |
| 2002/0109718 A1 | 8/2002 | Mansour et al. | |
| 2003/0009603 A1 | 1/2003 | Ruths et al. | |
| 2003/0014488 A1* | 1/2003 | Dalal et al. | 709/204 |
| 2003/0018719 A1 | 1/2003 | Ruths et al. | |
| 2003/0018726 A1* | 1/2003 | Low et al. | 709/206 |
| 2003/0041108 A1 | 2/2003 | Henrick et al. | |
| 2003/0093263 A1 | 5/2003 | Chen et al. | |
| 2003/0144892 A1 | 7/2003 | Cowan et al. | |
| 2003/0188001 A1* | 10/2003 | Eisenberg et al. | 709/229 |
| 2004/0093595 A1 | 5/2004 | Bilange | |
| 2004/0107256 A1 | 6/2004 | Odenwald et al. | |
| 2004/0158602 A1 | 8/2004 | Broberg | |
| 2004/0215722 A1 | 10/2004 | Mukherjee | |
| 2004/0215799 A1* | 10/2004 | Lehmann et al. | 709/230 |
| 2004/0236639 A1 | 11/2004 | Candadai et al. | |
| 2004/0249811 A1 | 12/2004 | Shostack et al. | |
| 2005/0089023 A1 | 4/2005 | Barkley et al. | |
| 2005/0091435 A1 | 4/2005 | Han et al. | |
| 2005/0289532 A1 | 12/2005 | Zakon et al. | |
| 2006/0112179 A1 | 5/2006 | Baumeister et al. | |
| 2007/0005804 A1 | 1/2007 | Rideout | |
| 2008/0253362 A1 | 10/2008 | Samarasinghe et al. | |

FOREIGN PATENT DOCUMENTS

| | | |
|---|---|---|
| JP | 10040080 | 2/1998 |
| JP | 2000-250756 | 9/2000 |
| JP | 2003-22251 | 1/2003 |
| KR | 1019980065416 | 10/1998 |
| WO | 01/98936 | 12/2001 |

OTHER PUBLICATIONS

Sridhar et al. "Standard SIP-based instant messaging and presence APIs for networked devices."; Proceedings 5th IEEE International Workshop on Networked Appliances (Cat. No. 02EX635), 2002, p. 59-64.*

Chabert, A., et al., "Java Object-Sharing in Habanero," Communications of the Association for Computing Machinery, Association for Computing Machinery, New York, vol. 41, No. 6, Jun. 1998 (pp. 69-76).

Non-Final Rejection, U.S. Appl. No. 10/923,598, mailed on Oct. 15, 2008, 15 pages.

Final Rejection, U.S. Appl. No. 10/923,598, mailed on Apr. 15, 2009, 18 pages.

Non-Final Rejection, U.S. Appl. No. 10/923,598, mailed on Sep. 25, 2009, 15 pages.

Final Rejection, U.S. Appl. No. 10/923,598, mailed on Mar. 17, 2010, 17 pages.

Non-Final Rejection, U.S. Appl. No. 10/923,598, mailed on Oct. 13, 2010, 18 pages.

Dourish, Paul, "Using Metalevel Techniques in a Flexible Toolkit for CSCW Applications," ACM Transactions on Computer-Human Internaction, 5(2), 109-155, 1998.

Office Action by Mexican Patent Office, Application No. PA/a/2004/010559, May 28, 2009, 10 pages.

Official Action by Patent Office of the Russian Federation, Application No. 2004131024, Nov. 20, 2008, 4 pages.

Examiner's First Report by Australian Patent Office, Application No. 2004222762, Sep. 16, 2009, 2 pages.

Notice of First Office Action by Shanghai Patent & Trademark Office, Application No. 200410090196.4, Oct. 24, 2008, 10 pages.

First Action German Patent Office, Application No. DE 60 2004 007 864, mailed on Apr. 17, 2008.

European Search Report for application No. 04024964.1-1244, mailed on Feb. 1, 2005, 3 pages.

Yamaguchi Manabu, "The new communication world created by Windows Messenger and RTC," Enterprise Servers WORLD, vol. 5, No. 6 (Serial No. 47), pp. 69 to 72, IDG Japan, Inc., Japan, Jun. 1, 2002.

Rosoff, Matt "The disintegration of the confused instant messaging products," Directions on Microsoft, No. 17, pp. 42 to 44, Media Select, Inc., Japan, Apr. 15, 2003.

Japanese Notice of Rejection mailed Feb. 25, 2011, in Application No. 2004-308917 (7 pages).

Japanese Final Rejection Feb. 17, 2012, in Application No. 2004-308917 (4 pages).

Rosenberg, et al. "SIP: Session Initiation Protocol," Jun. 2002, RFC 3261, pp. 1-252.

USPTO Amendment filed Jan. 15, 2009, in U.S. Appl. No. 10/923,598 (11 pages).

USPTO Amendment filed Jul. 15, 2009, in U.S. Appl. No. 10/923,598 (11 pages).

USPTO Amendment filed Dec. 28, 2009, in U.S. Appl. No. 10/923,598 (8 pages).

USPTO Amendment filed Jun. 17, 2010, in U.S. Appl. No. 10/923,598 (11 pages).

USPTO Amendment filed Jan. 13, 2011, in U.S. Appl. No. 10/923,598 (17 pages).

USPTO Final Rejection mailed Mar. 16, 2011, in U.S. Appl. No. 10/923,598 (18 pages).

European Communication mailed Feb. 9, 2006 in Application No. 04024964 (5 pages).

European Decision to Grant mailed Jul. 5, 2007, in Application No. 04024964 (2 pages).

Chinese Notice on Grant of Patent Right for Invention mailed Jul. 24, 2009, in Application No. 200410090196 (2 pages).

Australia Notice of Acceptance mailed Feb. 23, 2010, in Application No. 2004222762 (3 pages).

* cited by examiner

ARCHITECTURE FOR AN EXTENSIBLE REAL-TIME COLLABORATION SYSTEM

CROSS-REFERENCE TO RELATED APPLICATION(S)

This application is a continuation of commonly assigned U.S. patent application Ser. No. 10/918,333, entitled "ARCHITECTURE FOR AN EXTENSIBLE REAL-TIME COLLABORATION SYSTEM," filed on Aug. 13, 2004, which application is now abandoned, and claims the benefit of U.S. Provisional Application No. 60/513,790, entitled "Live-Communication V 2 API Architecture," filed on Oct. 23, 2003, and "U.S. Provisional Application No. 60/599,807, entitled "Real-Time Collaboration Systems," filed on Aug. 6, 2004, which applications are incorporated herein in their entireties by reference.

TECHNICAL FIELD

The described technology relates generally to data communications and, more particularly, to an architecture for an extensible real-time collaboration system.

BACKGROUND

Various communications applications and protocols enable communications between software programs or users. As examples, real-time communications applications such as MICROSOFT WINDOWS MESSENGER and Voice over Internet Protocol ("VoIP") enable communications between users sending each other text, video, or voice data. These applications may use various protocols, such as Session Initiation Protocol ("SIP"), Real-Time Transport Protocol ("RTP"), and Real-Time Control Protocol ("RTCP"), to establish sessions and send communications-related information. SIP is an application-layer control protocol that devices can use to discover one another and to establish, modify, and terminate sessions between devices. RTP is a protocol for delivering audio and video over the Internet, and is frequently used in streaming media systems and videoconferencing systems in conjunction with other protocols such as RTCP and H.323. RTCP is a protocol that enables a client application to monitor and control data sent or received using RTP, and is used with RTP. SIP and RTP/RTCP are Internet proposed standards. Their specifications, "RFC 3261" and "RFC 3550," and respectively, are available on the Internet at www.ietf.org at /rfc/rfc3261.txt and www.faqs.org at /rfcs/rfc3550.html, respectively, and are incorporated herein in their entirety by reference.

Applications may additionally use other protocols. Applications may use enhanced versions of the protocols indicated above or altogether different protocols that are designed to carry specialized data. As an example, when a new or improved protocol for carrying videoconferencing information becomes available, an application developer creating or modifying an application may desire to use the new or improved protocol, e.g., to improve performance or offer additional features. To use the new or improved protocol, the application developer may need to modify portions of the application that interact with communications protocols because an improvement to a protocol or a new protocol may have a different interface than a protocol already being used. As an example, while a protocol may have a NewSession interface to create a new session, an improved version may have a StartSession method that creates and starts a session and accepts additional parameters. Because StartSession accepts additional parameters, its interface is different from NewSession, and so an application using NewSession may need to be modified to use StartSession. When a protocol has a different interface, application developers may need to learn the different interface and modify their applications to use this interface to use the protocol.

Application developers may need to become familiar with details of each of the many communications protocols they use in applications they develop. As an example, when an application developer uses SIP and RTP/RTCP, the application developer may need to be familiar with all three protocols to provide program logic relating to the protocols. An application developer not familiar with all three protocols may need additional training and time to become familiar with these protocols. Furthermore, when the application is to be modified to work with additional or improved protocols, the application developer may need to revise or add programming logic so that the application can function with these protocols. This could lead to additional development expense and difficulty.

Furthermore, various protocols present a variety of complexities. For example, to provide a videoconferencing facility in an application, the application's developer would have to become familiar with a number of protocols and provide logic to coordinate these protocols to add videoconferencing capabilities. Adding other collaboration capabilities to an application, such as text messaging, voice messaging, etc., presents other similar complexities.

Thus, an architecture for an extensible real-time collaboration system that facilitates addition of collaboration features in an application without significant investment in developer training would have significant utility.

SUMMARY

An architecture for an extensible real-time collaboration system is provided. The architecture presents a unified application program interface ("API") for writing application programs that use communications protocols. The architecture has activity objects, endpoint objects, and multiple media stacks. These objects may use various communications protocols, such as Session Initiation Protocol or Real-Time Transport Protocol to send and receive messages containing information. The activity objects, endpoint objects, and multiple media stacks may each have one or more APIs that an application developer can use to access or provide collaboration-related functionality. These objects map the API to the underlying implementation provided by other objects. Using the activity objects enables a developer to provide less application logic than would otherwise be necessary to provide complex collaboration services.

DETAILED DESCRIPTION

In an embodiment, an architecture for an extensible real-time collaboration system is provided. The architecture provides a high-level application program interface ("API") for writing application programs that use communications protocols to provide collaboration services. An application developer can add collaboration services to an application by using the API without needing to learn complexities associated with several underlying protocols that implement the collaboration services.

The architecture comprises activities objects, endpoint objects, and multiple media stacks. These objects may use various communications protocols, such as SIP or RTP/RTCP, to send and receive messages. The activities objects, endpoint objects, and multiple media stacks may each have one or more APIs that an application developer can use to access or provide functionality provided by the objects. The application developer can choose to provide application logic that utilizes the APIs provided by endpoint objects and media stacks, or can choose to provide application logic that utilizes the API provided by an activity object. By utilizing the APIs provided by the endpoint objects and media stacks, the application developer may be able to exercise a high degree of flexibility, but may have to provide significantly more application logic than if only an activity object's API is used. An application developer may choose to use the activity object's API for several reasons. The API of the activity objects provides a higher-level interface than the APIs of the endpoint object and media stacks. Furthermore, the activity objects coordinate the endpoint object and the media stack, and so application logic may not need to be provided to perform the coordination.

Activity objects provide services to applications and other objects. Activity objects are objects that enable an application to participate in a variety of specific activities, and may include, as examples, instant messaging, teleconferencing, videoconferencing, application sharing, and other activities. Activity objects may be considered to be "wrapper" objects that provide the functionality of underlying objects, including endpoint objects and media stacks. In particular, activity objects coordinate endpoint objects and media stacks to provide a seamless and integrated session to other objects using the activity objects, such as applications.

An example of the benefit of using an activity object is provided by the following example. An application developer may desire to provide videoconferencing capabilities in an application. To do so, the application developer would first have to become familiar with a signaling protocol, such as SIP, and a media protocol, such as RTP/RTCP. Next, the application developer may have to provide application logic to create a session, determine whether a contact with whom videoconferencing is desired is presently online, send an invitation to join a videoconference, negotiate various parameters relating to the videoconference, capture audio and video from sound and video capturing hardware, and finally exchange audio/video data using RTP/RTCP. In contrast, by using a videoconferencing activity object of the architecture, many of these steps are eliminated because the videoconference activity object is especially designed to consolidate this application program logic into a few higher-level interfaces. The architecture has similar activity objects for a variety of other collaboration activities. Furthermore, the architecture provides support for additional activity objects to be added in the future.

An endpoint object provides management services, such as signaling. An endpoint object comprises profile, publishing/subscribing, signaling, and protocol stack components. The profile component may provide an abstraction of a user through an API. The publishing/subscribing component provides interfaces to track presence and availability information relating to users. The signaling component may be used to provide or receive infrequent, transactional messages relating to establishing or controlling sessions. The signaling component may also be used for negotiating, e.g., media parameters such as bandwidth limit. The protocol stack component is used by the profile, publishing/subscribing, and signaling components to send or receive data, and supports various protocols, including SIP.

As previously described, the activity object provides a facility for application developers to add collaboration services to applications easily. As an example, an application developer desiring to add videoconferencing in an application may provide logic to create (or "instantiate") a videoconferencing activity object. The videoconferencing activity object may then instantiate an endpoint object for signaling (such as a SIP endpoint object) and a messaging media stack for carrying audio/video data. During subsequent videoconferencing activities (e.g., when sending or receiving an audio/video stream), the activity object may coordinate the objects it created or instantiated. In an embodiment, the application may create the objects and, optionally, provide an indication of the objects to the activity object. In such a case, the activity object may not need to create these objects.

Media stack objects provide content communications services, such as handling audio/video data streams. As an example, a media stack object may use RTP/RTCP to send or receive audiovisual information relating to a videoconference.

Figure 1:
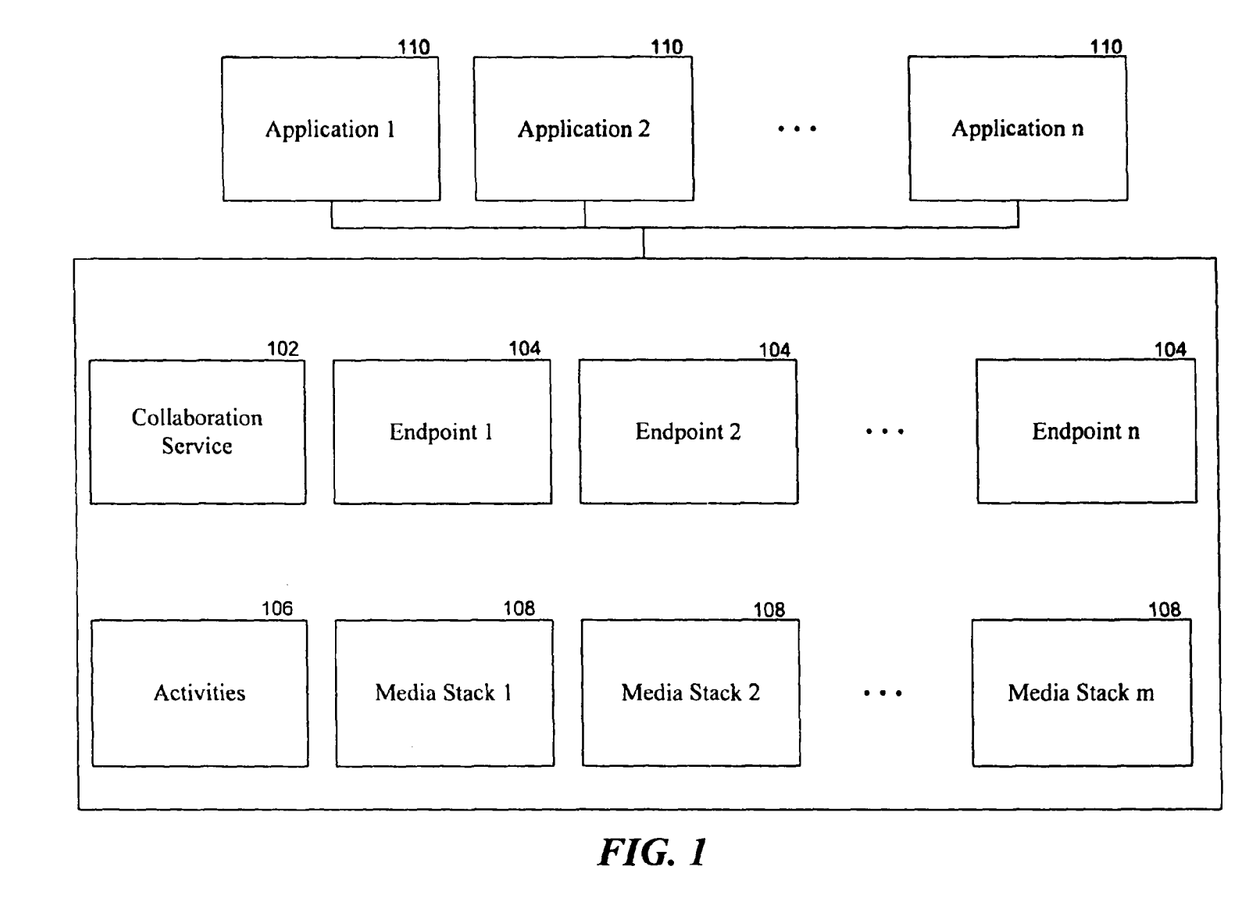
FIG. 1 is a block diagram illustrating components of an architecture for an extensible real-time collaboration system in an embodiment.

Turning now to the figures, FIG. 1 is a block diagram illustrating components of an architecture for an extensible real-time collaboration system in an embodiment. The architecture for an extensible real-time collaboration system comprises a collaboration service object 102, multiple endpoint objects 104, activity objects 106, and multiple media stacks 108. One or more applications 110 may utilize the architecture by accessing various methods, properties, and events relating to the architecture. An application developer writing an application may utilize the architecture by using a unified API instead of having to learn and implement a different API for each media stack, protocol, or other component that the application or architecture may use.

The collaboration service object 102 provides a facility for applications to share multiple endpoint objects and may provide a consistent API across a number of endpoint objects. As an example, if endpoint object 1 provides an interface relating to receiving (or sending) information, and endpoint object 2 similarly provides an interface relating to receiving (or sending) information, but the two interfaces use different names yet perform similar functions, the collaboration service object may provide a common name for both interfaces. When an application developer uses this common name in an application, the application developer may not need to revise the application when a new or modified object that provides an interface with a different name is used with the collaboration service object.

Endpoint objects 104 provide a facility for signaling other objects. Signaling may be used between two endpoint objects having a session, e.g., so that an endpoint object can invite or request the other endpoint object to conduct an activity or exchange information relating to the session. As examples, an endpoint object may invite the other endpoint object of the session to an instant messaging conversation and subsequently may send text messages relating to the conversation. Endpoint objects are further described below in greater detail in relation to FIG. 2.

Activity objects are components that enable an application to participate in a variety of collaboration-related activities. These components provide an API that an application developer can use to coordinate endpoint objects and media stacks. Activity objects 106 are further described below in greater detail in relation to FIG. 3.

A media stack object 108 provides content communications services, such as handling data streams, and provides an API for other objects to send or receive the data. The architecture is capable of supporting virtually an infinite number of media stacks by virtue of the fact that the architecture does not need to distinguish between the data or media types. As a result, new media stacks may be added or media stacks may be modified as requirements change. An example of a media stack is RTP/RTCP. This media stack may be used to send audiovisual information.

Figure 2:
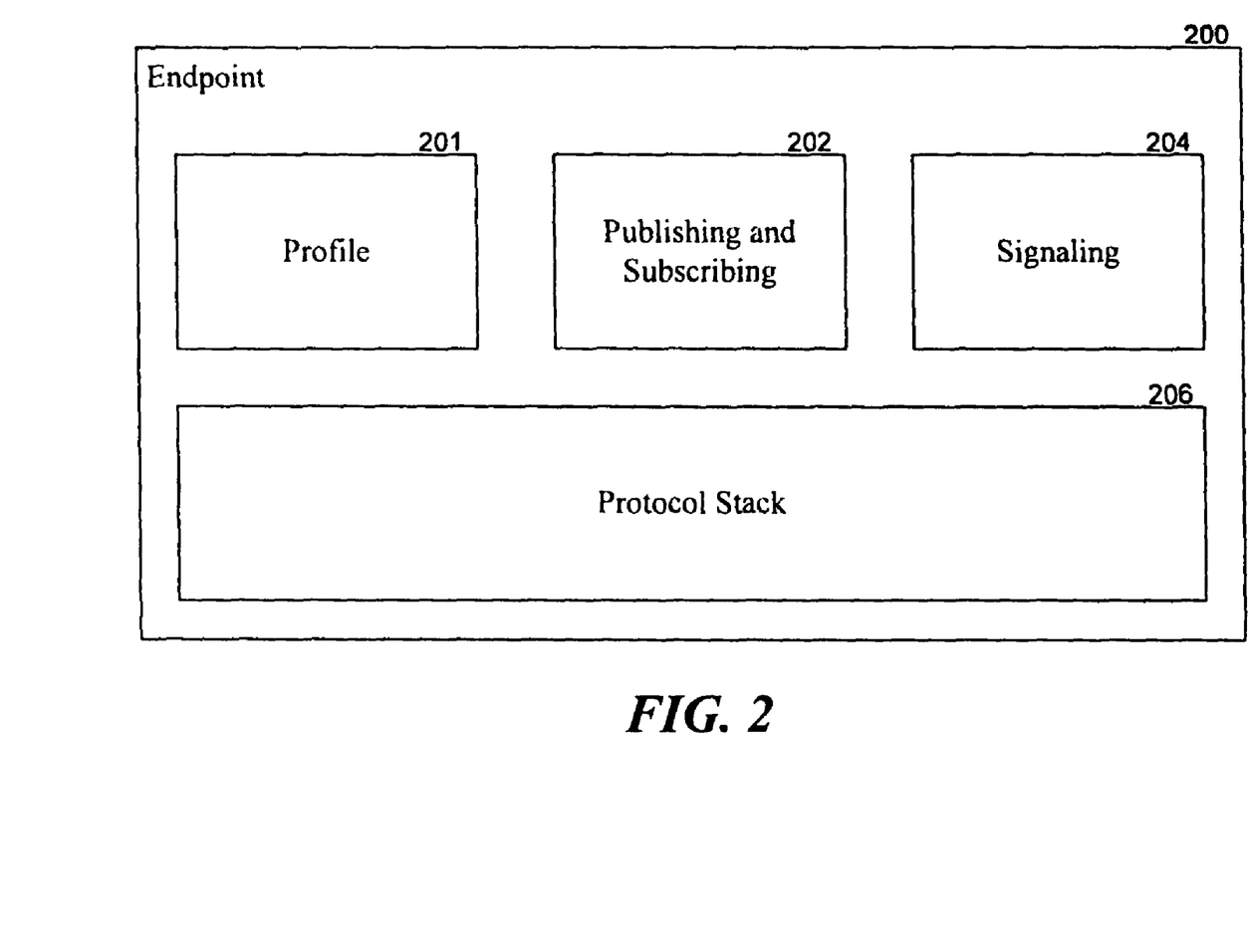
FIG. 2 is a block diagram illustrating components of an endpoint object of the extensible real-time collaboration system in an embodiment.

FIG. 2 is a block diagram illustrating components of an endpoint object of the extensible real-time collaboration system in an embodiment. Endpoint objects provide management services, such as a facility for signaling other objects. Signaling may be used between two endpoint objects having a session, e.g., so that an endpoint object can invite or request the other endpoint object to conduct an activity or exchange information relating to the session. As examples, an endpoint object may invite the other endpoint object of the session to an instant messaging conversation and subsequently may send text messages associated with the conversation.

The architecture may support several varieties of endpoint objects, and each variety of endpoint object may be instantiated multiple times. As an example, there may be an endpoint object relating to a user's personal Internet service provider account (e.g., MSN.COM) and another endpoint object relating to the user's corporate Internet account (e.g., MICROSOFT.COM). The user may be logged in to service providers using the personal account on multiple devices (e.g., a handheld computing device and a desktop computing device) and may also be logged in using the corporate account on some of the devices (e.g., the desktop computing device). Thus, there may be two instances relating to the URI associated with the personal account. Individual instances of endpoint objects may then be uniquely identified by a combination of a uniform resource locator ("URI") and an endpoint identifier ("EID"). As an example, an endpoint object may be identified by the URI user@MSN.COM and by the EID "1234." As previously described, the EID may be used to particularly distinguish an instance of an endpoint object from another instance of an endpoint object that is associated with the same URI.

An endpoint object may provide a "data" interface and a "signaling" interface. The data interface may include methods, events, and properties relating to data that is published or subscribed to by the endpoint object. By publishing or subscribing to data, an application may provide data or be notified of changes to data. The signaling interface may provide methods, events, and properties relating to controlling signaling of the endpoint object. As examples, signaling characteristics may include creating or joining sessions, entering or leaving conversations, accepting or declining invitations, and other signals.

The illustrated endpoint object 200 comprises a profile component 201, publishing and subscribing component 202, signaling component 204, and protocol stack component 206.

The profile component may provide an abstraction of a user through an API. It maintains service-related information for the user, such as an electronic address (e.g., URI), credentials used for the service provider, the service provider's status, capability, and policies. Users may have multiple profiles in relation to different service providers. The user could also have more than one profile per service provider. The profile component may be used when creating sessions with other users, e.g., to provide the user's URI. The profile component may provide methods to log on or off a user in relation to a service provider.

The publishing/subscribing component provides interfaces to track presence and availability information relating to users. Presence information relates to whether a user is present at a particular computing device. Availability information relates to whether the present user is available to receive a message or willing to do so. As an example, a user of a cellular telephone may be present when the cellular telephone is turned on, but may be unavailable for a messaging session when the user is participating in a phone call. Similarly, a user who has set a "busy" indication in MICROSOFT WINDOWS MESSENGER may be present but unavailable for messaging.

As further examples, the presence object may provide information relating to a user who is present and available to participate in a MICROSOFT WINDOWS MESSENGER conversation using a computing device and is also available to participate in a teleconference using a cellular telephone. When the user is no longer logged into MICROSOFT WINDOWS MESSENGER, the presence object may update this information so that an application using the presence object is able to determine that the user is no longer present or available to participate in the MICROSOFT WINDOWS MESSENGER conversation. Thus, presence information indicates whether users or other objects are present. Various service providers or protocols may use different mechanisms to produce or provide presence information. So that an application developer does not need to be aware of the multiple ways of producing or providing presence information, an application developer may use the endpoint object to produce or use presence information.

The publishing/subscribing component provides a subscribe interface to create a subscription to another object's publication, a publish interface to provide subscriptions to other objects, and a notify interface to receive notifications relating to services whose publications have been subscribed to. These interfaces enable an application to use the component to provide, receive, or track presence information. As an example, when a user participates in a MICROSOFT WINDOWS MESSENGER conversation using a personal computer and participates in a teleconference using a cellular telephone, the publishing/subscribing component may detect and report the user's presence at both locations. A URI and EID may together uniquely identify instances of endpoint objects. Because a user may be present at multiple locations simultaneously, the user's URI may be indicated as present at these multiple locations. The addition of an EID in relation to a given URI provides a mechanism to uniquely identify a particular instance of presence.

Notifications may be provided relating to various information. As examples, notifications may be provided relating to whether a user is online, busy, available, out for lunch, etc. Notifications may also be provided relating to geographic location of a user (e.g., as provided by a global positioning system or "GPS") contact information, calendar information, out of office messages, audio/video capabilities, etc.

The signaling component may also be used to provide or receive infrequent, transactional messages relating to establishing or controlling sessions. This component may also be used for negotiating, e.g., media parameters such as frames per second.

The protocol stack object is responsible for sending and receiving information using a protocol. As an example, SIP may be used to send or receive signaling information. In various embodiments, other protocols can equally be used. In an embodiment, an endpoint object may be compatible with multiple protocols. In such a case, the endpoint object may be able to use, e.g., multiple protocols, as necessary, to send or receive information. Alternatively, the architecture may support multiple endpoint object-protocol combinations as separate endpoint objects. In such a case, one endpoint object may be used for SIP and another for some other protocol.

Figure 3:
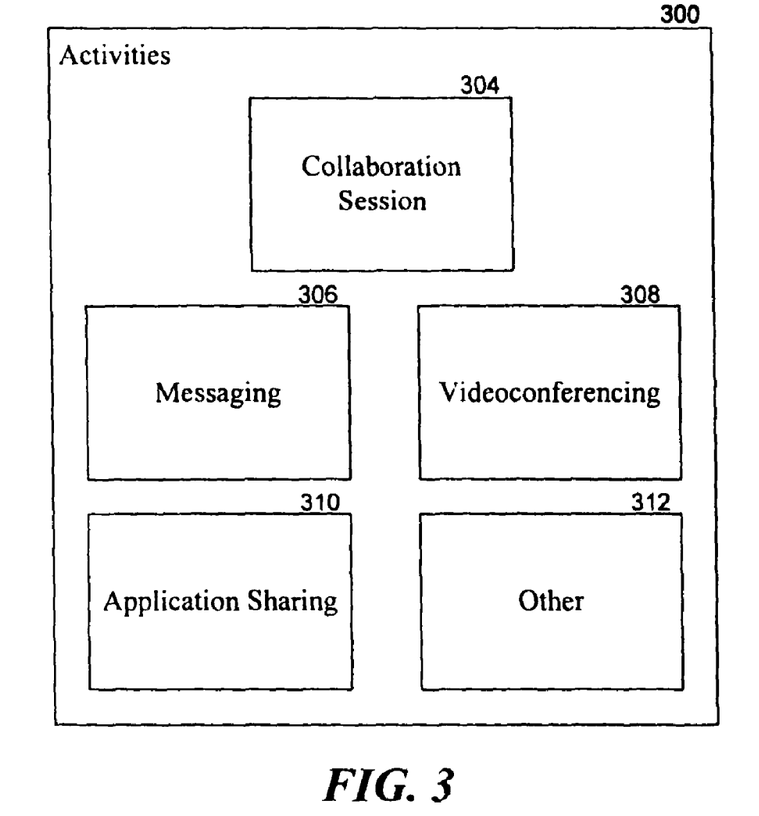
FIG. 3 is a block diagram illustrating activity objects of the extensible real-time collaboration system in an embodiment.

FIG. 3 is a block diagram illustrating activity objects of the extensible real-time collaboration system in an embodiment. Activity objects provide services to applications and other objects. Activity objects are objects that enable an application to participate in a variety of specific activities, and may include, as examples, instant messaging, teleconferencing, videoconferencing, application sharing, and other activities. Activity objects may be considered to be "wrapper" objects that provide the functionality of underlying objects, including endpoint objects and media stacks. In particular, activity objects coordinate endpoint objects and media stacks to provide a seamless and integrated session to objects using the activity objects, such as applications.

Each activity object provides functionality that enables an application using the object to participate in a variety of activities. As an example, an activity object may encapsulate signaling and media information. In doing so, the activity object may serve as a bridge between signaling and media, so that an application using the activity object is provided an integrated view. For example, an application developer would merely request a videoconference rather than having to set up separate SIP and RTP/RTCP connections and sessions. The illustrated examples of activities are described below.

A collaboration session activity object 304 enables an application to provide collaboration services to the application's users. As an example, the collaboration session activity object may enable two users using two different computers to collaborate by authoring a shared document.

An application sharing activity object 310 enables an application using the application sharing activity object to provide functionality relating to the sharing of applications between users using different computing devices. As an example, two users may share a "whiteboard" application, e.g., using which a user can provide visual information that the other user can view and manipulate.

A messaging activity object 306 provides an ability for applications to provide messaging capabilities to the application's users. As an example, an application developer may want to enable messaging within an application the developer is creating. As a specific example, when two users are collaborating on a document by simultaneously editing a document, the users may want to be able to send text messages to one another or participate in a videoconference during the collaboration. In such a case, an application developer may use a collaboration session activity object as well as messaging or videoconferencing activity objects to enable users to collaborate and exchange messages with one another during the collaboration.

A videoconferencing activity object 308 provides videoconferencing facilities to an application. Videoconferencing may involve sending and receiving audiovisual information.

Additional activity objects are also contemplated, and are represented as activity objects 312.

An application developer may use objects of the architecture described above (and those not listed or described) by utilizing APIs provided by the objects. These objects may provide an easy-to-use API so that an application developer may not need to reference APIs provided by underlying components that provide the services associated with the activity objects. As an example, a messaging service provider may provide an API that a developer could use. To do so, the developer may need to spend time to learn the API, which can be quite complicated. Instead, the developer may wish to use a simpler API provided by an object of the architecture. Furthermore, the object may encapsulate steps that may be required to use multiple different objects. As an example, an application developer wishing to exchange messages between two computers may need to utilize an API provided by the SIP as well as an API exposed by another low-level object that provides messaging services. In contrast, the application developer would only need to use the messaging activity object, and thereby be able to add messaging functionality to an application much more easily. Furthermore, the framework may operate to coordinate multiple objects, thereby requiring less programming logic from the application developer.

In an embodiment, a collaboration session contains and uses activity objects.

Figure 4:
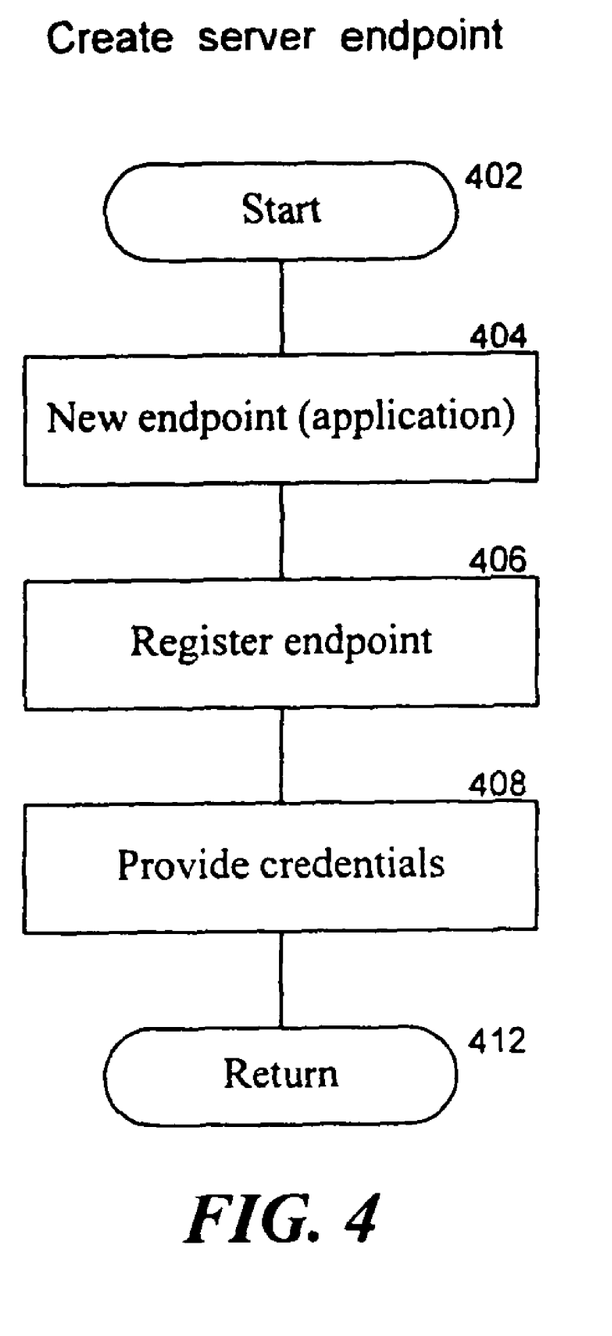
FIG. 4 is a flow diagram illustrating a create_server_endpoint routine in an embodiment.

FIG. 4 is a flow diagram illustrating a create_server_endpoint routine in an embodiment. The routine is called by an application to create an endpoint object that connects to a server. When an endpoint is created that connects to a server, information it publishes may be available to subscribing objects even after the created endpoint is no longer operating. Thus, an endpoint connected to a server may provide "per-URI" information meaning that the information remains available after the object's lifetime.

The routine begins at block 402. At block 404, the routine creates a new endpoint object, and indicates that the endpoint is related to an application. The indicated application may be provided as a parameter to a create function that operates to create the endpoint. When creating an endpoint, a "friendly" name may be provided so that the endpoint may be referenced by the friendly name. Alternatively, the newly created endpoint may be referenced by a unique identifier associated with the endpoint. This unique identifier may be generated by the system when the object is created.

At block 406, upon creating the endpoint, the application may register the newly created endpoint object to the server to allow the server to route messages to this endpoint. Upon receiving the register request from the endpoint object, the server may issue a challenge to the endpoint. The challenge may contain a "realm" used by the server. A realm may indicate a domain name associated with the server. As an example, the server may issue a challenge with the realm "MICROSOFT.com."

At block 408, the routine responds to the challenge by providing credentials (e.g., user id and password) associated with the application. These credentials may be supplied by a user or automatically. The server may validate the credentials that the routine supplies. The credentials may be associated with the realm. For example, if the application provides credentials that are not associated with the server's realm ("MICROSOFT.com"), the server may not authenticate the application.

If the registration is successful, the endpoint may be ready to receive messages from other objects. Otherwise, the endpoint may be unable to receive messages.

The routine returns to its caller at block 412.

In an embodiment, the server may enable an endpoint that is not successfully registered to send messages but not receive messages. Alternatively, in a weaker security model, the server may enable any endpoint to send or receive messages.

In an embodiment, the server may challenge an endpoint when the endpoint attempts to send a message but not when it receives messages.

An alternate routine (not shown) may create a peer-to-peer endpoint. A peer-to-peer endpoint is one that is not associated with a server. When an endpoint is not associated with a server, information the endpoint publishes may not be available once the endpoint stops operating.

Figure 5:
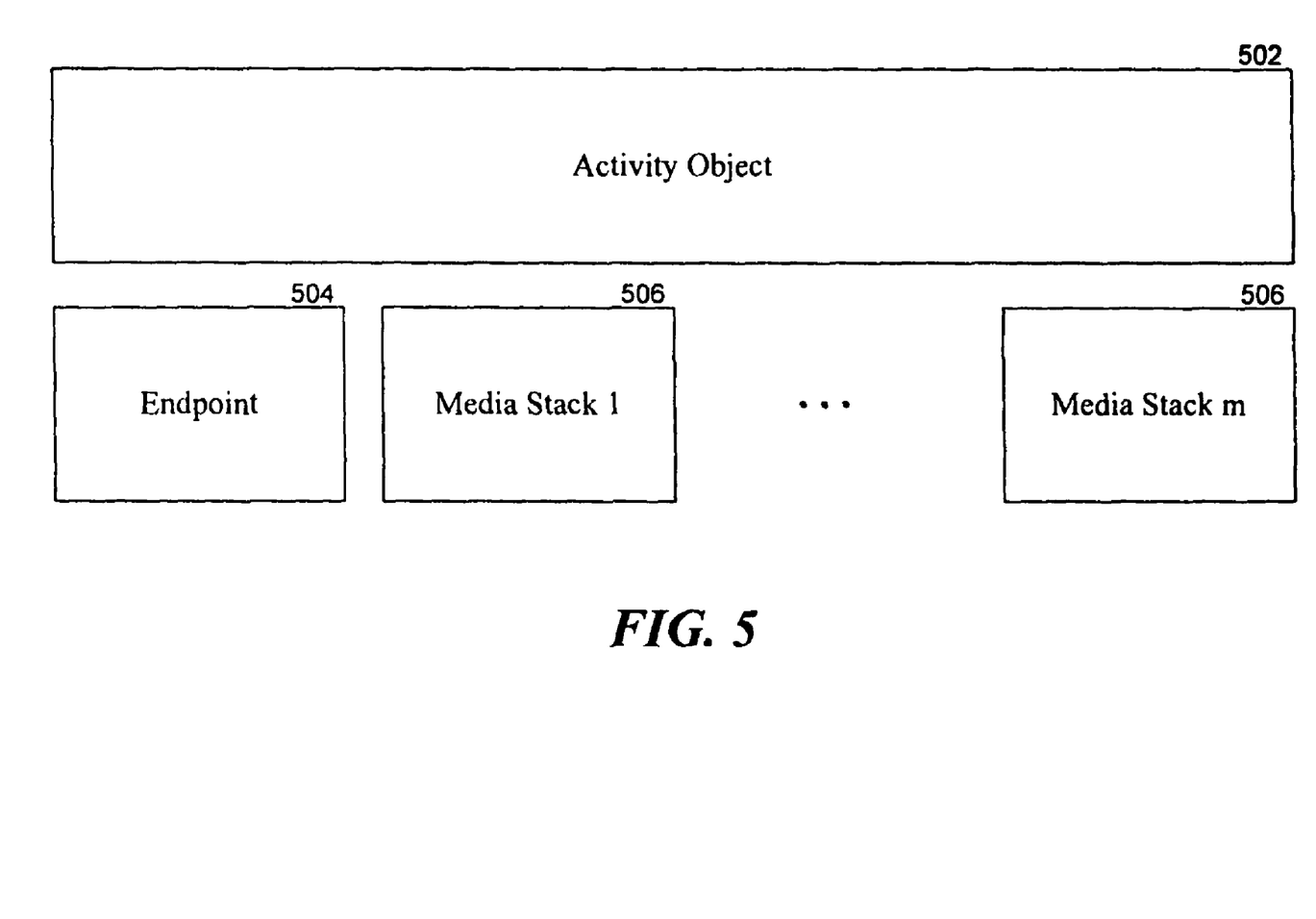
FIG. 5 is an architecture diagram illustrating the architecture for an extensible real-time collaboration system in an embodiment.

FIG. 5 is an architecture diagram illustrating the architecture for an extensible real-time collaboration system in an embodiment. The architecture comprises an activity object 502, endpoint 504, and multiple media stack objects 506. These objects have been discussed in extensive detail. The architecture diagram indicates a relationship between the activity object, endpoint object, and media stack objects in an embodiment. Specifically, the architecture diagram indicates that functionality provided by an activity object includes functionality provided by the endpoint and media stack objects.

In an embodiment, multiple activity objects may be used with corresponding media stack objects.

Applications may call methods of objects of the architecture, or may directly call methods of underlying objects that implement functionality. By calling methods of the architecture's objects, application developers may need to provide less logic, and may not need to revise the application logic when the underlying components change.

The following presents some APIs provided by the architecture.

An application can create an endpoint object by creating a new "CollaborationEndpoint." The application can provide the following parameters: a URI relating to the endpoint object, a server associated with the endpoint object, and an indication of network credentials.

A NetworkCredential method provides the indication of network credentials. This method accepts as parameters an indication of a user account, password, and domain with which the account is associated.

An Enter method registers the endpoint, and provides an indication of a success or failure. The method does not require parameters.

A Publish method publishes presence information. As examples, an application can indicate that a user is online, offline, busy, on the phone, etc. The architecture is flexible enough to provide virtually an unlimited number of presence indications. For example, an application may choose to publish a user's GPS location.

Conversely, a Subscribe method subscribes to an endpoint object's publication.

An Invite method invites a user to a collaboration session. The method receives an indication of a URI that should be invited.

An Accept method accepts an invitation. Conversely, a Decline method declines the invitation.

A messaging activity object can be created from an InstantMessagingActivity class. This activity object supports various methods including, e.g., a method to send a message, SendMessage.

The SendMessage method sends a message. It receives a message string as a parameter.

The methods may be provided by various objects of the architecture. The architecture may additionally provide methods, properties, and events relating to retrieving a user's properties, adding a user to a list of contacts, adding or removing participants from a conversation, and so on.

The computing device on which the architecture is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communications link. Various communications links may be used, such as the Internet, a local area network, a wide area network, or a point-to-point dial-up connection.

The architecture may be implemented in a variety of operating environments, including computing devices running a MICROSOFT WINDOWS operating system. This operating environment is only one example of a suitable operating environment and is not intended to suggest any limitation as to the scope of use or functionality of the system. Other well-known computing systems, environments, and configurations that may be suitable for use include personal computers, server computers, hand-held or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The architecture may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a computing system for providing real-time collaboration services in an application, comprising:

instantiating a first activity object, stored at a computing device, that employs a first endpoint object and a first media stack object to provide a first collaboration service, the first activity object comprising at least one of a collaboration session activity object, an application session activity object, a messaging activity object, and a videoconferencing activity object, wherein the first endpoint object supports a first signaling protocol for providing management services, and wherein the first media stack object supports a first media protocol for providing content communication services, the first activity object providing a first unified application program interface for coordinating the first signaling protocol and the first media protocol;

instantiating a second activity object, stored at the computing device, that employs a second endpoint object and a second media stack object to provide a second collaboration service, the second activity object being different from the first activity object and comprising at least one of a collaboration session activity object, an application session activity object, a messaging activity object, and a videoconferencing activity object, wherein the second endpoint object supports a second signaling protocol for providing management services, and wherein the second media stack object supports a second media protocol for providing content communication services, the second activity object providing a second unified application program interface for coordinating the second signaling protocol and the second media protocol;

invoking methods of the first unified application program interface of the first activity object at the computing device, the first unified application program interface comprising a first high-level interface of consolidated programming logic of the first signaling protocol and the first media protocol, wherein the invoked methods provide the underlying functionality of the first endpoint object and the first media stack object between applications that communicate information using the first collaboration service;

invoking methods of the second unified application program interface comprising a second high-level interface of consolidated programming logic of the second signaling protocol and the second media protocol, wherein the invoked methods provide the underlying functionality of the second endpoint object and the second media stack object between applications that communicate using the second collaboration service;

wherein the first and second signaling protocols provide negotiation for bandwidth parameters;

wherein the collaboration session activity object enables a plurality of users at different computing devices to collaborate on a shared document; and wherein the shared document is simultaneously open for editing by the plurality of collaborating users.

2. The method of claim 1 wherein the first endpoint object uses a Session Initiation Protocol.

3. The method of claim 1 wherein the first media stack object provides the content communications services via an application program interface that the activity object employs.

4. The method of claim 3 wherein the first media stack object uses Real-Time Transport Protocol.

5. The method of claim 1 wherein the content communications services include providing media.

6. The method of claim 1 wherein a user is available when the user is online at two devices.

7. The method of claim 1 wherein a user is not available when the user was online at two devices at a first time and is online at only one of the two devices at a second time after the first time.

8. An extensible real-time collaboration system, comprising:
at least two media stack objects stored and implemented by a computing device wherein a first media stack object communicates collaboration content using a first media protocol and a second media stack object communicates collaboration content using a second media protocol that is different from the first media protocol;
an endpoint object stored and implemented by the computing device, the endpoint object for providing or receiving signaling information using a signaling protocol;
an activity object stored and implemented by the computing device to provide a collaboration service, the activity object comprising at least one of a collaboration session activity object, an application session activity object, a messaging activity object, and a videoconferencing activity object the activity object having a unified application program interface, the unified application program interface comprising a high-level interface of consolidated programming logic of the first media protocol, the second media protocol, and the signaling protocol, wherein invoked methods of the unified application program interface provide the underlying functionality of the endpoint object the first media stack object, and the second media stack object between applications that communicate information using the collaboration service;
wherein the first and second media protocols provide negotiation for bandwidth parameters;
wherein the collaboration session activity object enables a plurality of users at different computing devices to collaborate on a shared document; and
wherein the shared document is simultaneously open for editing by the plurality of collaborating users.

9. The extensible real-time collaboration system of claim 8 wherein the unified application program interface provides a consistent application program interface name for both the first media stack object providing a first application program interface name and the second media stack object providing a second application program interface name.

10. The extensible real-time collaboration system of claim 8 wherein one of the collaboration services is messaging.

11. The extensible real-time collaboration system of claim 8 wherein one of the collaboration services is videoconferencing.

12. The extensible real-time collaboration system of claim 8 wherein one of the collaboration services is application sharing.

13. The extensible real-time collaboration system of claim 8 wherein a new media stack object is added to the multiple media stack objects.

14. The extensible real-time collaboration system of claim 8 wherein the endpoint object comprises a profile component, a publishing and subscribing component, a signaling component, and a protocol stack component.

15. The extensible real-time collaboration system of claim 14 wherein the protocol stack component uses a Session Initiation Protocol.

16. The extensible real-time collaboration system of claim 14 wherein the protocol stack component uses a signaling protocol.

17. The extensible real-time collaboration system of claim 8 wherein one of the multiple media stack objects uses Real-Time Transport Protocol.

18. The extensible real-time collaboration system of claim 17 wherein the activity object coordinates one of the multiple media stack objects and the endpoint object under direction of the application.

19. A computer storage medium not consisting of a propagated data signal and storing computer-executable instructions that, if executed, perform a method for providing real-time collaboration services in an application, the instructions comprising:
instantiating a first activity object, at a computing device, that employs first endpoint object and a first media stack object to provide a first collaboration service, the first activity object comprising at least one of a collaboration session activity object, an application session activity object, a messaging activity object, and a videoconferencing activity object, wherein the first endpoint object supports a first signaling protocol for providing management services, and wherein the first media stack object supports a first media protocol for providing content communication services, the first activity object providing a first unified application program interface for coordinating the first signaling protocol and the first media protocol;

instantiating a second activity object, at the computing device, that employs a second endpoint object and a second media stack object to provide a second collaboration service, the second activity object being different from the first activity object and comprising at least one of a collaboration session activity object, an application session activity object, a messaging activity object, and a videoconferencing activity object, wherein the second endpoint object supports a second signaling protocol for providing management services, and wherein the second media stack object supports a second media protocol for providing content communication services, the second activity object providing a second unified application program interface for coordinating the second signaling protocol and the second media protocol;

invoking methods of the first unified application program interface of the first activity object at the computing device, the first unified application program interface comprising a first high-level interface of consolidated programming logic of the first signaling protocol and the first media protocol, wherein the invoked methods provide the underlying functionality of the first endpoint object and the first media stack object between applications that communicate information using the first collaboration service, invoking methods of the second unified application program interface comprising a second high-level interface of consolidated programming logic of the second signaling protocol and the second media protocol, wherein the invoked methods provide the underlying functionality of the second endpoint object and the second media stack object between applications that communicate using the second collaboration service, wherein the first and second signaling protocols provide negotiation for bandwidth parameters;

wherein the collaboration session activity object enables a plurality of users at different computing devices to collaborate on a shared document; and wherein the shared document is simultaneously open for editing by the plurality of collaborating users.

\* \* \* \* \*